P. S. LELEAN.
DISINFECTING OF, AND DESTRUCTION OF VERMIN IN CLOTHES, BEDDING, AND THE LIKE.
APPLICATION FILED JAN. 29, 1920.
1,352,289. Patented Sept. 7, 1920.
6 SHEETS—SHEET 2.
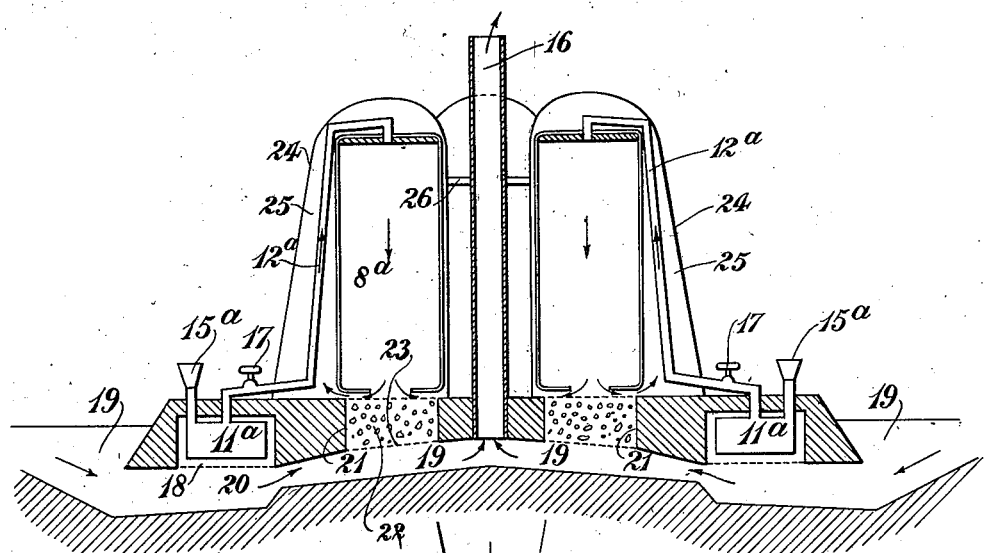
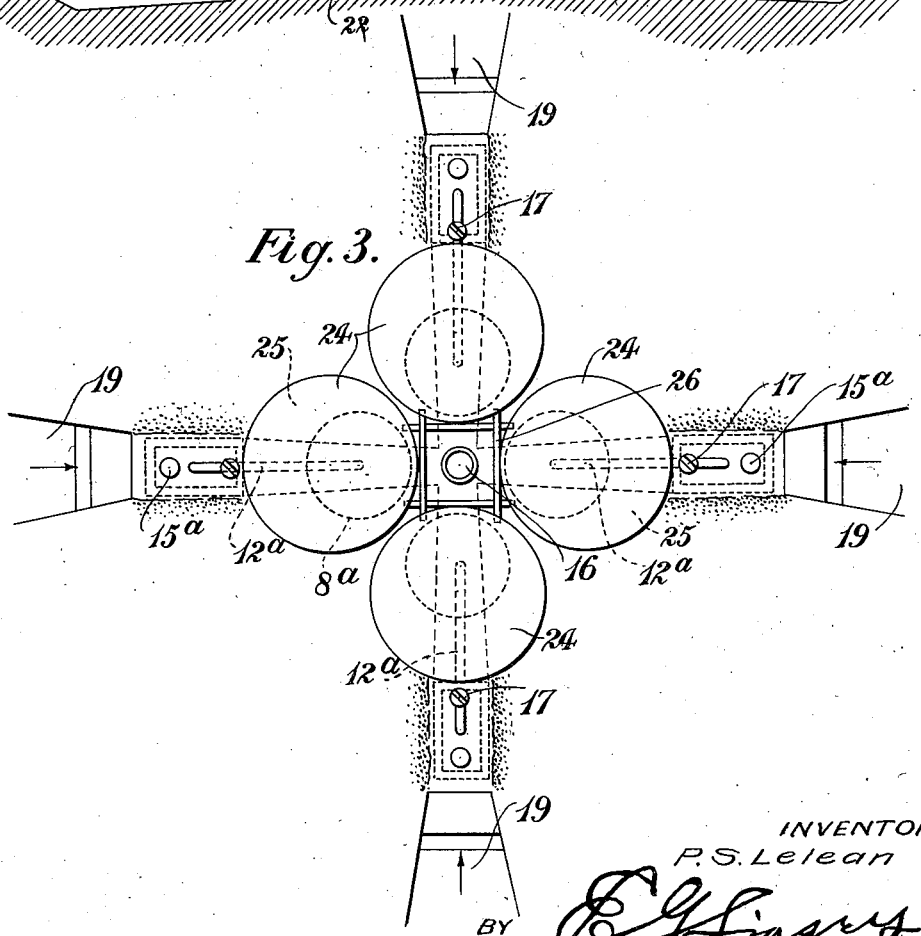
INVENTOR:
P. S. Lelean
BY
ATTORNY

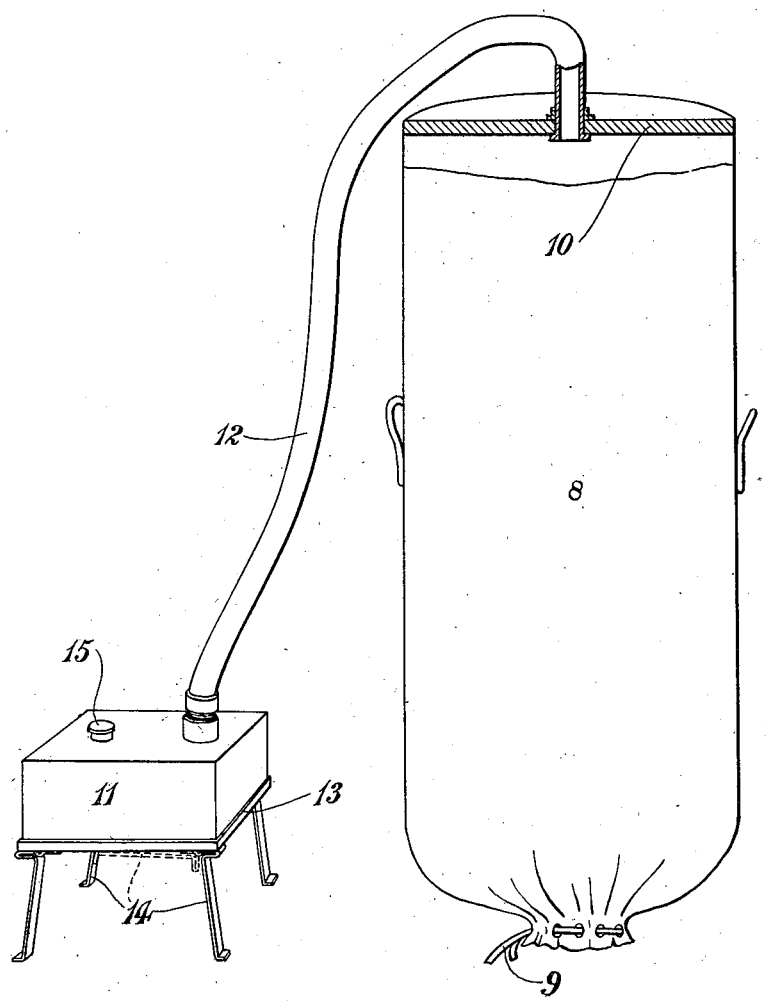

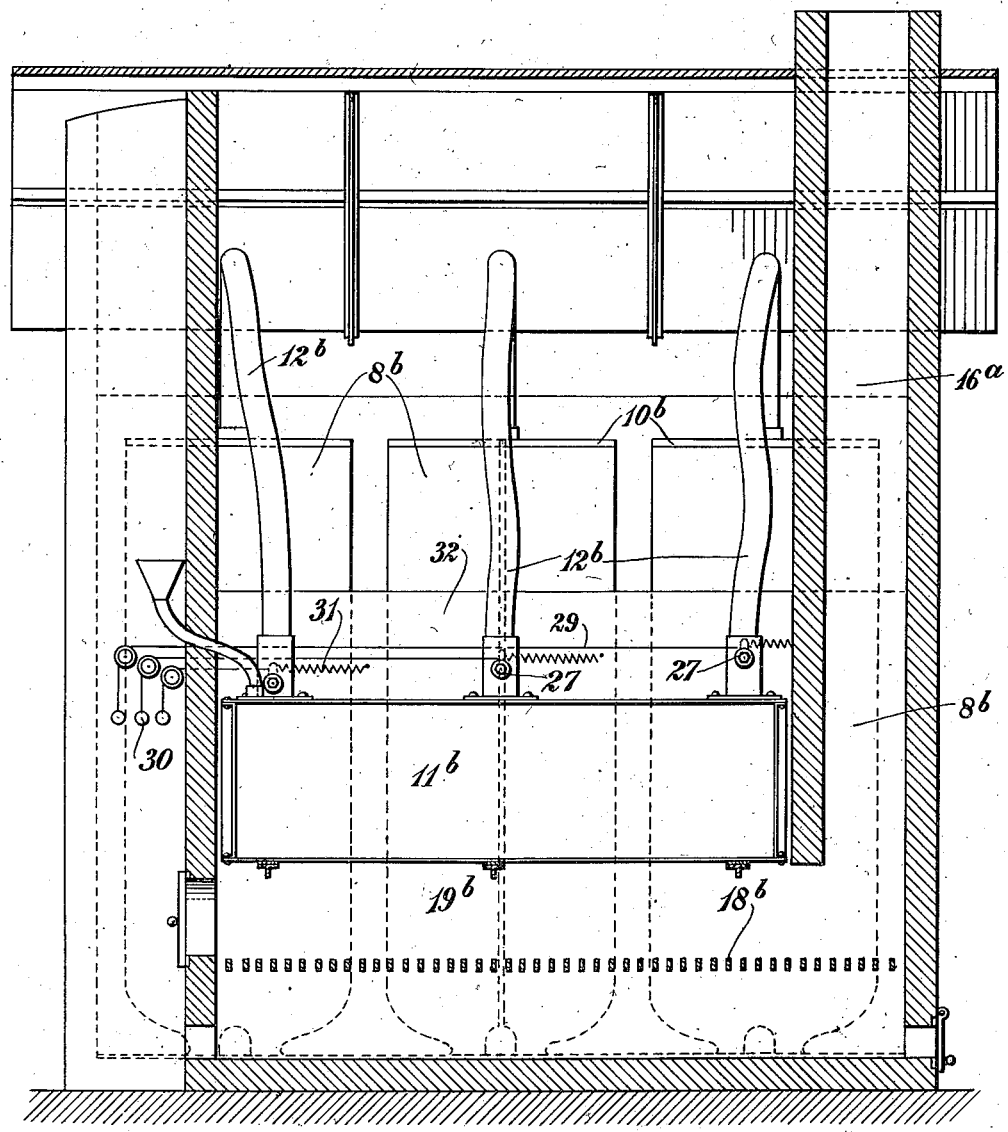

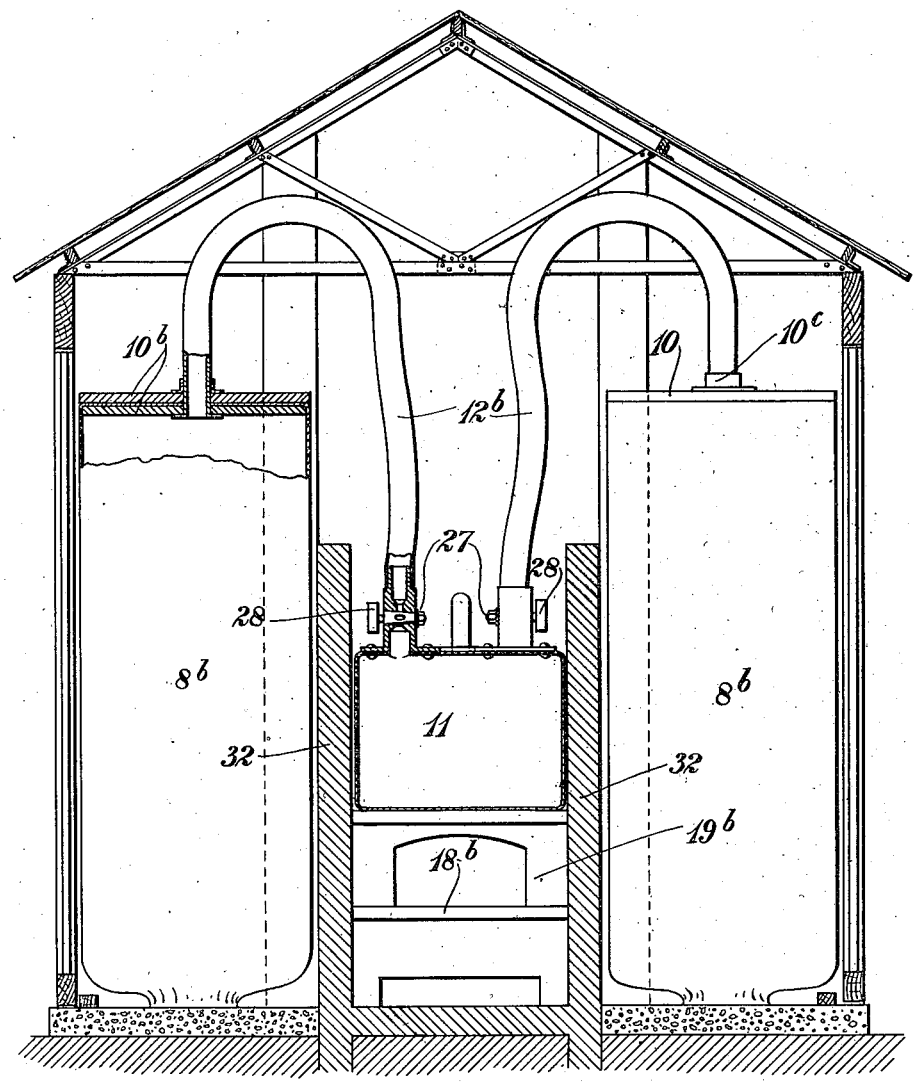

P. S. LELEAN.
DISINFECTING OF, AND DESTRUCTION OF VERMIN IN CLOTHES, BEDDING, AND THE LIKE.
APPLICATION FILED JAN. 29, 1920.

1,352,289.

Patented Sept. 7, 1920.
6 SHEETS—SHEET 5.

INVENTOR:
P. S. Lelean
BY
ATTORNEY

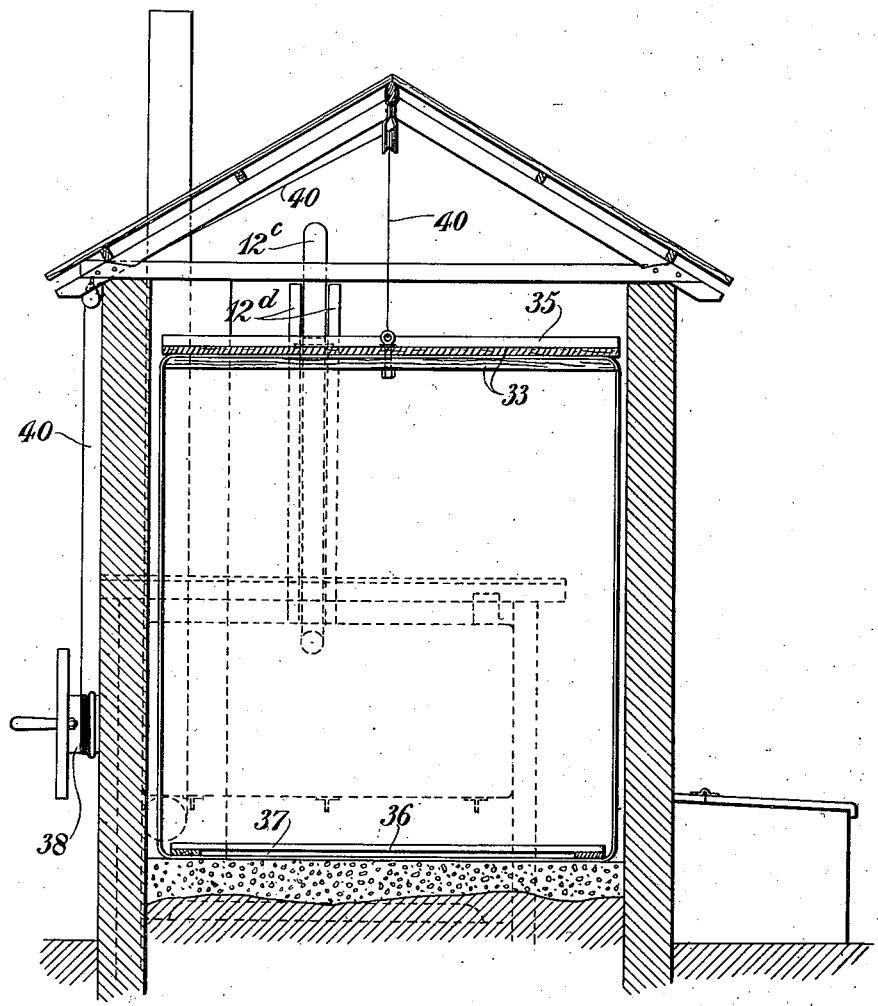

UNITED STATES PATENT OFFICE.

PERCY SAMUEL LELEAN, OF WESTMINSTER, LONDON, ENGLAND.

DISINFECTING OF, AND DESTRUCTION OF VERMIN IN CLOTHES, BEDDING, AND THE LIKE.

1,352,289.   Specification of Letters Patent.   Patented Sept. 7, 1920.

Application filed January 29, 1920. Serial No. 354,845.

*To all whom it may concern:*

Be it known that I, PERCY SAMUEL LELEAN, a subject of His Majesty the King of England, and resident of Westminster, in the county of London, Kingdom of England, have invented certain new and useful Improvements Relating to the Disinfecting of, and Destruction of Vermin in Clothes, Bedding, and the like, of which the following is a specification.

This invention relates to the disinfecting of, and destruction of vermin in, clothes, bedding and the like.

The invention has for its primary object to provide improved, simple, inexpensive and efficient means whereby clothing, bedding and other articles can be effectively, quickly and easily disinfected or sterilized, and vermin and their eggs in such articles be quickly and positively destroyed, said means being applicable to military, municipal and private requirements.

According to the invention the clothes and (or) other articles to be treated are directly arranged within a collapsible chamber made of flexible fluid-tight material, and current steam is admitted directly into the chamber at the top thereof and is caused to pass downwardly therethrough, and to uniformly, positively and intimately contact with and penetrate the whole of its contents by the downward displacement, layer by layer, of the air therein and until only steam is present, this action of the steam being facilitated and rendered efficacious by expelling as much as possible of the air from the chamber and its contents before the admission of said steam thereinto.

The improved apparatus provided by the present invention is particularly adaptable for use for treating the kits of troops in the field, and for sterilizing clothing and bedding, after infection, and is thus especially applicable to the needs of labor gangs and of emigrant stations, hospitals, workhouses, and other civilian establishments, as well as of the crews and passengers on board ships.

Several methods of carrying out the invention will now be described with reference to the accompanying drawings, in which:—

Figure 1 is a partly sectional perspective view of the improved apparatus in one of its simplest and portable forms particularly adaptable for use for military, municipal and private purposes;

Fig. 2 is a sectional elevation and Fig. 3 a plan, both largely diagrammatic, of a semi-portable construction of the apparatus embodying a battery of four units.

Figs. 4 and 5 are a longitudinal section and a transverse section, respectively, of a rigid or stationary and modified form of the apparatus particularly adaptable for use for municipal and like purposes;

Figs. 6 and 7 are views respectively similar to Figs. 4 and 5 of a further modified rigid construction of the apparatus.

Figure 6:
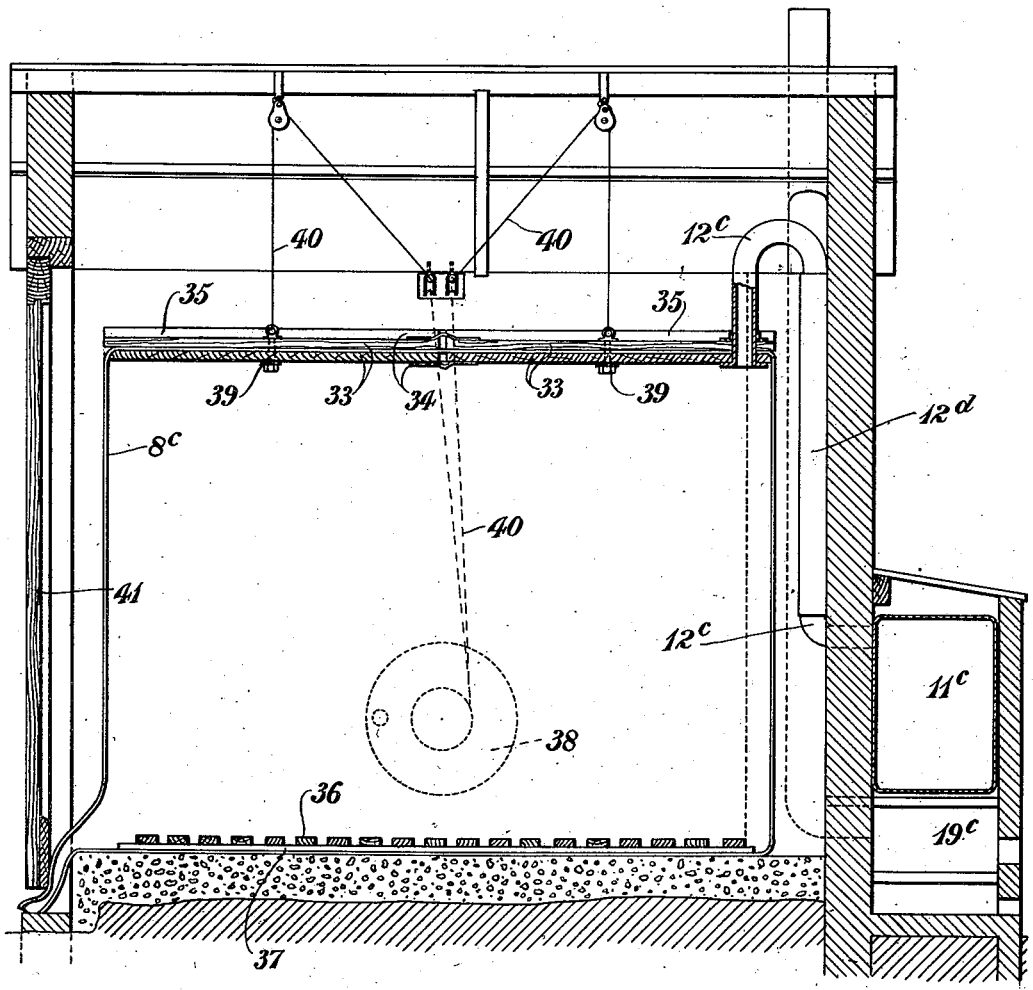

In one of its simplest and portable forms the apparatus comprises, as shown in Fig. 1, a waterproofed canvas or other sack 8, or other steam-tight collapsible envelop, one end of which is designed to be closed by a draw string 9 or other suitable fastening device, while its other end is fitted with a wooden or other disk 10 and adapted to be connected to a boiler 11 by a conduit 12 through which steam can be admitted into the sack or envelop. The conduit 12 may be a canvas or other flexible hose or an iron or other rigid pipe, and the connections of the ends of said hose or pipe to the sack or envelop and to the boiler may vary according to requirements and to the nature of the material of which the hose or pipe is made. The boiler 11 is shown supported, detachably or permanently, within an L-iron or other suitable frame 13 fitted with legs 14 adapted to be folded against the bottom of the frame or boiler, and provided with a filling cap 15, and said boiler may be heated by being placed over a fire of coal, coke or wood on the ground or in an inclosed space fitted with a grate, or by one or more oil or gas burners. For municipal and like purposes the apparatus of Fig. 1 could be carried to a house or other establishment by a cyclist and the boiler be heated on a kitchen range or gas stove without the use of the stand 13, 14, or an oil stove could form part of the apparatus, in which case said frame would be employed. Steam could be supplied direct to the envelop from a steam pipe on board ship or elsewhere. Thus, clothes, bedding and the like could be disinfected at the houses of infectious cases by the portable apparatus of Fig. 1 weighing altogether about 50 lbs. and capable of disinfecting the contents of the sack or envelop in about half an hour. If desired, and especially if the apparatus is used in the cold open air, the sack or envelop may be covered by heat-insulating material such as loose blanketing or the like to prevent loss of heat and to assist and facilitate the action of the steam, but the use of such a covering in warm areas would be optional.

Figs. 2 and 3 represent a form of the apparatus embodying a set of four units each similar to that illustrated in Fig. 1 and radiating from a central chimney 16, the essential parts in this arrangement being portable and said arrangement being particularly adaptable for field work or for a similar purpose in which the apparatus is designed to be transported from place to place and erected *in situ* as and when required. In this construction each of the units comprises a steam-tight collapsible sack or envelop $8^a$ connected to a boiler $11^a$ by a flexible hose $12^b$ or a rigid metal pipe $12^a$ of substantially S shape, the boiler being provided with a filling funnel $15^a$ fitted with a closing plug or valve. The funnel and pipe $12^a$ are preferably made to screw on and off the boiler, and said pipe can be formed in two or more sections adapted to screw together; if desired the pipe may be fitted with a stop cock or valve such as 17. The boiler is preferably supported upon fire bars 18 over a trench 19 serving as an air intake flue leading to the chimney 16 and serving as a furnace at 20. A vertical hot air flue 21 leads from the flue 19 and is filled with stones or other loose material 22 disposed between two perforated corrugated metal disks or plates 23 upon the upper one of which the sack or envelop $8^a$ rests. The members 23 and the material 22 prevent scorching of the sack or envelop. Preferably blanketing or the like heat-insulating material 24 is arranged over and around the sack and pipe $12^a$ to form an inclosing chamber 25 therefor, but said chamber may be formed by constructing inclosing walls of stones and mud, bricks or the like, and a door opening and the roof opening of said chamber can be closed by blanketing or the like. In either arrangement, the chamber is adapted to receive hot air passing thereinto through the flue 21, so that the loss of heat is minimized by the insulating action of this surrounding hot air chamber, and the efficiency of the apparatus is increased by the fact that the boiler is embedded in mud or other heat insulating material over and under ground surface. The sacks or envelops $8^a$ are separated from the chimney 16 by a bamboo, wooden or other frame 26, which frame also serves to support the blanketing or the like 24.

With the constructions of the apparatus above described, after the sack or envelop 8 or $8^a$ has been turned mouth upward and filled with the articles to be treated, and the mouth thereof more or less closed by means of the draw string 9 or other fastening device, said sack or envelop is placed vertically with said mouth downward and the air therein expelled, as much as possible, by pressure upon the sack or envelop. Steam from the boiler 11 or $11^a$ is then allowed to enter the top of the sack or envelop and to expel the air remaining therein by downward displacement, layer by layer, until only steam is present in intimate contact with the articles in said sack or envelop. The steam is allowed to pass through the sack or envelop and to escape through the mouth thereof for some time, after which the steam is cut off or the sack is otherwise disconnected from the boiler. The sack or envelop is then turned with its mouth upward, the draw string 9 or fastening device is loosened and the articles are removed from the sack or envelop and allowed to dry. In passing through the sack or envelop the steam intimately contacts with and thoroughly penetrates the whole of the contents of the latter, thus expelling all the air therein, efficiently disinfecting the same and positively destroying all germs or vermin or the eggs of vermin that may be present. Owing to the small amount of heat conducting air remaining within the sack after the latter has been compressed, and owing to the uniform downward displacement of the said remaining air by the steam in successive layers, penetration of the contents of said sack is rapid and positive. This arrangement is, obviously more efficient than the devices usually employed in which the steam enters the bottom of a chamber, and being lighter than the air which it displaces, rapidly rises through the said chamber between the articles which it contains and escapes to waste without fully penetrating all the separate contents. For transporting purposes the boiler, pipe hose and sack or envelop may be detached from one another, said boiler, pipe, hose, and, in the construction shown in Figs. 2 and 3, the fire bars 18 and the disks or plates 23, may be placed within the sack or envelop and the latter rolled up around these parts and tied up. If desired the whole may be placed within a case or box adapted to be carried by means of straps by a cyclist, soldier or other person upon his back.

The construction and arrangement of the parts of the apparatus can be modified to adapt the same for use by municipal, hospital, or other like bodies, and be permanently erected for these purposes. Examples of such construction of the apparatus are illustrated in Figs. 4 to 7.

Thus, for stationary installations on a large scale a chamber constructed of canvas or any other suitable flexible and waterproof material can be provided and, if desirable, sub-divided vertically into compartments each supplied with steam from an independent or common boiler. Figs. 4 and 5 show an arrangement of six separate sacks or envelops 8$^b$ disposed within a brick or other building provided with a chimney 16$^a$, a furnace flue 19$^b$ and firebars 18$^b$ and said sacks or envelops are arranged on both sides of and connected to a boiler 11$^b$ common to them all and connected to them by canvas or other flexible pipes 12$^b$. The hose pipes are connected to the sacks or envelops by means including two wooden or other disks 10$^b$ and strengthening or supporting collars 10$^c$. Means are preferably provided whereby the supply of steam from the boiler to each of the sacks or envelops can be independently controlled, and suitable means for this purpose comprise a tapered cock or valve 27 disposed between the boiler and the hose, a drum 28 mounted on the spindle of the said cock or valve, a cord or the like 29 having one end wound upon said drum and its other end passed to the exterior of the building and fitted with an operating ring or handle 30, and a return spring 31 connected to said cord or the like and to a partition wall 32 disposed between the boiler and the sacks or envelops. This wall prevents direct heating of the sack or envelop by the boiler and fire.

In a further modified construction of the apparatus a more or less heavy and removable roof may be applied to the envelop, which in this case may be in the form of a square, or other shaped chamber of canvas or other flexible and waterproofed material, and said roof may be adapted to be adjusted by means of a windlass and pulleys or other suitable devices to partially close the chamber and squeeze out the air therefrom after the articles to be treated have been placed within the chamber. Apparatus of this type is shown in Figs. 6 and 7 of the drawings and comprises a substantially rectangular waterproofed canvas or like collapsible chamber 8$^c$ arranged within a brick or other building provided with an exteriorly arranged boiler 11$^c$ which is fitted over a furnace 19$^c$ and connected to said chamber by means of a flexible pipe 12$^c$. The pipe 12$^c$ is guided between two spaced vertical bars 12$^d$ which allow it to rise and fall with the roof or upper portion of the chamber. Said roof or upper portion is formed of separate wooden or other boards 33 hinged to one another at 34 and strengthened by L-iron or other suitable diagonals 35, thus enabling the roof to easily collapse and to be variously adjusted. The bottom of the chamber is fitted with transverse and longitudinal wooden or other stiffening bars 36 and 37 respectively. Suitable means for raising and lowering the movable roof of the chamber 8$^c$ consist of an exteriorly arranged windlass 38 connected to said roof at 39 by means of cords 40 passed into the building and over suitable guide pulleys. As indicated in Fig. 6 the mouth of the chamber, when the latter is filled with the articles to be treated, is partially closed at and gripped underneath the door or doors 41 of the building, so that steam escapes from it at a level below that of the floor of the chamber. The majority of the air within the chamber and its contents can be pressed out of the same by lowering the roof and by manual pressure exerted upon the latter, and after the steam has been passed through the chamber the roof can be slowly raised to facilitate the drying of contents by the hot air within the building. If desired the roof of the chamber can be formed rigid, that is, the top plates would not be hinged as in the manner above described.

What I claim is:—

1. Disinfecting apparatus comprising a sack adapted to contain the articles to be treated, said sack having a contractible end portion through which the articles may be introduced, the other end portion of the sack having a relatively stiff or rigid member closing the same, a boiler, and means passing through the rigid member for conducting steam from the boiler into the sack, said rigid member being at the top during the disinfecting operation, the contractible end providing an outlet for the air in the sack to escape whereby the steam passes through the sack from the top downwardly, the sack itself being collapsible whereby most of the surplus air may be squeezed out of the same prior to the introduction of the steam.

2. Disinfecting apparatus comprising a sack adapted to contain the articles to be treated, said sack having a contractible end portion through which the articles may be introduced, the other end portion of the sack having a relatively stiff or rigid member closing the same, a boiler, means passing through the rigid member for conducting steam from the boiler into the sack, an insulating hot air chamber inclosing the sack, and means for supporting the sack within said chamber, said rigid member being at the top during the disinfecting operation, the contractible end providing an outlet for the air in the sack to escape whereby the steam passes through the sack from the top downwardly, the sack itself being collapsible whereby most of the surplus air may be squeezed out of the same prior to the introduction of the steam.

In testimony whereof I have hereunto signed my name.

PERCY SAMUEL LELEAN.